United States Patent
Meng et al.

(10) Patent No.: US 9,940,301 B2
(45) Date of Patent: Apr. 10, 2018

(54) CACHE MANAGEMENT FOR RDMA DATA STORES

(71) Applicant: International Business Machines Corporation, Armonk, NY (US)

(72) Inventors: Xiaoqiao Meng, Yorktown Heights, NY (US); Jian Tan, Wappingers Falls, NY (US); Yandong Wang, Elmsford, NY (US); Li Zhang, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 223 days.

(21) Appl. No.: 14/593,200

(22) Filed: Jan. 9, 2015

(65) Prior Publication Data

US 2016/0124897 A1 May 5, 2016

Related U.S. Application Data

(60) Provisional application No. 62/073,069, filed on Oct. 31, 2014.

(51) Int. Cl.
*G06F 15/167* (2006.01)
*H04L 29/08* (2006.01)
*G06F 15/173* (2006.01)

(52) U.S. Cl.
CPC ...... *G06F 15/167* (2013.01); *G06F 15/17331* (2013.01); *H04L 67/1097* (2013.01); *H04L 67/2842* (2013.01)

(58) Field of Classification Search
None
See application file for complete search history.

(56) References Cited

U.S. PATENT DOCUMENTS 6,173,293 B1 * 1/2001 Thekkath .......... G06F 17/30067
8,086,803 B2   12/2011 Muthiah et al.
9,076,012 B2    7/2015 George et al.
9,165,155 B2   10/2015 Druschel et al.
(Continued)

FOREIGN PATENT DOCUMENTS

JP          2012141885 A     7/2012

OTHER PUBLICATIONS

U.S. Appl. No. 14/741,663, filed Jun. 17, 2015.
List of IBM Patents or Patent Applications Treated as Related—Date Filed: Aug. 20, 2015; 2 pages.

*Primary Examiner* — Aaron Strange
*Assistant Examiner* — Mohammad Yousuf A Mian
(74) *Attorney, Agent, or Firm* — Cantor Colburn LLP; Yeen Tham

(57) ABSTRACT

Embodiments relate to methods, systems and computer program products for cache management in a Remote Direct Memory Access (RDMA) data store. Aspects include receiving a request from a remote computer to access a data item stored in the RDMA data store and creating a lease including a local expiration time for the data item. Aspects further include creating a remote pointer to the data item, wherein the remote pointer includes a remote expiration time and transmitting the remote pointer to the remote computer, wherein the lease is an agreement that that the remote computer can perform RDMA reads on the data item until the remote expiration time.

8 Claims, 6 Drawing Sheets

(56) References Cited

U.S. PATENT DOCUMENTS

| | | | |
|---|---|---|---|
| 9,176,911 B2 | 11/2015 | Davis et al. | |
| 2002/0152214 A1* | 10/2002 | Muntz | G06F 17/30067 |
| 2014/0012949 A1* | 1/2014 | Meyers | H04L 67/1095 |
| | | | 709/217 |
| 2014/0089585 A1* | 3/2014 | Nakajima | G06F 13/1663 |
| | | | 711/118 |
| 2014/0351151 A1* | 11/2014 | Chiu | G06Q 30/0645 |
| | | | 705/307 |

* cited by examiner

CACHE MANAGEMENT FOR RDMA DATA STORES

DOMESTIC PRIORITY

This application claims the benefits of the legally related U.S. Provisional Patent Application Ser. No. 62/073,069 filed Oct. 31, 2014, which is fully incorporated herein by reference.

BACKGROUND

The present invention relates generally to cache management and more particularly to cache management in a Remote Direct Memory Access (RDMA) data store.

In general, RDMA is a communication paradigm whereby data is fetched directly out of a host computer's memory and directly placed into the memory of a remote computer without requiring the processor of the host computer to process the read request. As a result, RDMA significantly reduces the load on the processor of the host computer for large data transfers by bypassing the operating system of the host computer and avoiding intermediate data copies in memory of the host computer. Accordingly, RDMA provides high throughput and low latency.

One drawback of using RDMA for cache data storage is that the host computer is not made aware of the accesses conducted by remote computers. Accordingly, it is not possible for the host computer to track how frequently each of the data items stored in the cache are accessed. This lack of information can lead to the host computer performing undesired evictions of data items from the cache if traditional cache management algorithms, e.g., LRU, CLOCK, are used. One solution to this problem would be for the remote computers to inform the host computer of all cache data accesses. However, this approach would generate a large number of messages that would need to be processed by the host computer and would significantly reduce the performance benefits of RDMA.

Accordingly, methods and systems for cache management in a RDMA data store are needed.

SUMMARY

Embodiments include methods for cache management in a Remote Direct Memory Access (RDMA) data store on a host computer. The method includes receiving a request from a remote computer to access a data item stored in the RDMA data store and creating a lease including a local expiration time for the data item. The method also includes creating a remote pointer to the data item, wherein the remote pointer includes a remote expiration time and transmitting the remote pointer to the remote computer, wherein the lease is an agreement that that the remote computer can perform RDMA reads on the data item until the remote expiration time.

Embodiments also include a computer program product for cache management in a Remote Direct Memory Access (RDMA) data store on a host computer, the computer program product including a tangible storage medium readable by a processing circuit and storing instructions for execution by the processing circuit for performing a method. The method includes receiving a request from a remote computer to access a data item stored in the RDMA data store and creating a lease including a local expiration time for the data item. The method also includes creating a remote pointer to the data item, wherein the remote pointer includes a remote expiration time and transmitting the remote pointer to the remote computer, wherein the lease is an agreement that that the remote computer can perform RDMA reads on the data item until the remote expiration time.

Embodiments further include a messaging system for cache management in a Remote Direct Memory Access (RDMA) data store on a host computer, the messaging system comprising a processor configured for performing a method. The method receiving a request from a remote computer to access a data item stored in the RDMA data store and creating a lease including a local expiration time for the data item. The method also includes creating a remote pointer to the data item, wherein the remote pointer includes a remote expiration time and transmitting the remote pointer to the remote computer, wherein the lease is an agreement that that the remote computer can perform RDMA reads on the data item until the remote expiration time.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
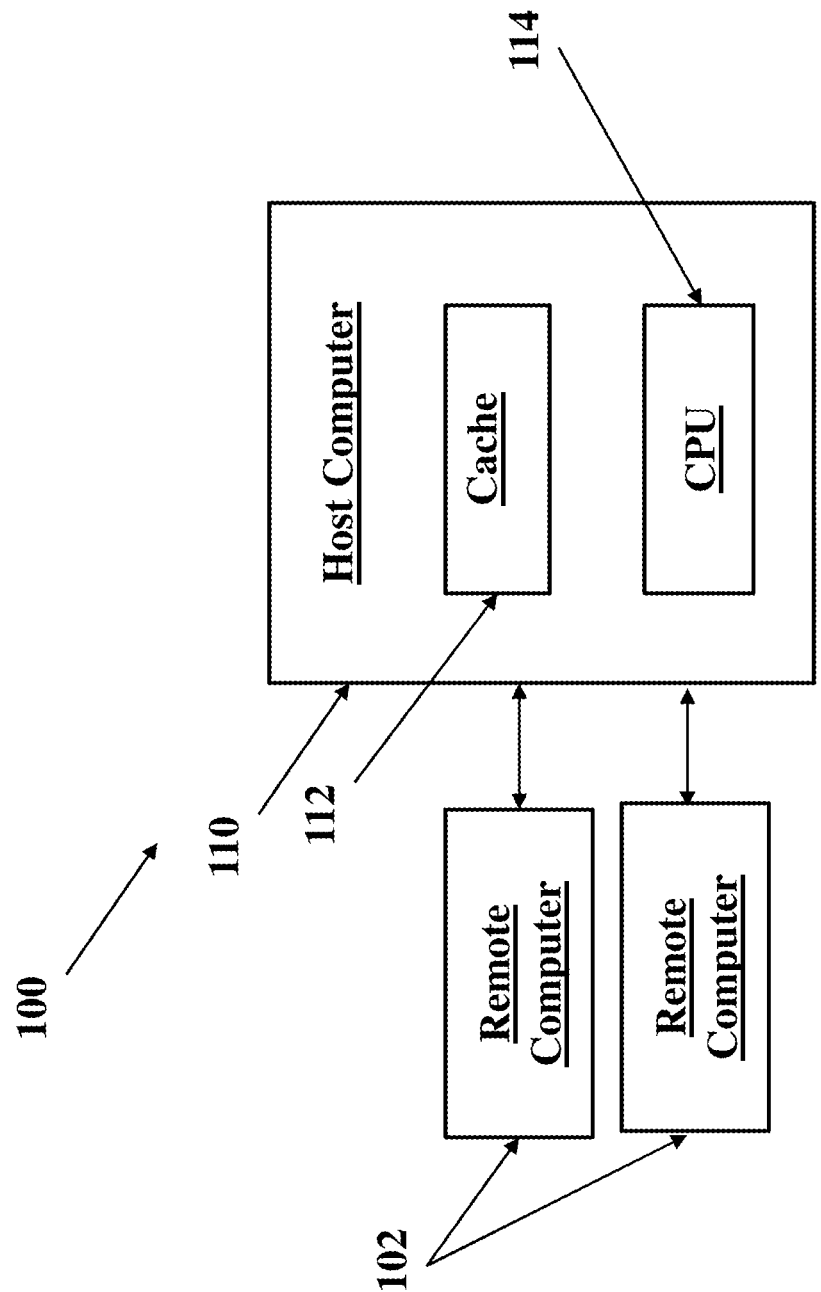
FIG. 1 depicts a block diagram of a system for cache management for an RDMA data store in accordance with an exemplary embodiment.

Referring to the drawings in more detail, and particularly referring to FIG. 1, a system 100 for cache management for an RDMA data store is shown. As illustrated the system includes multiple remote computers 102 which are accessing a cache 112 stored on a host computer 110. In exemplary embodiments, the host computer 110 utilizes a RMDA cache management method which allows each of the remote computers 102 to access data stored in the cache 112 without requiring the CPU 114 of the host computer 110 to process the read request.

In exemplary embodiments, when a remote computer 102 requests access to a data item from cache 112 of the host computer 110 for the first time, the host computer 110 returns a remote pointer to the data item in the cache of the remote computer. The remote pointer indicates the location of the data item inside of the cache 112. Once the remote computer 102 has a remote pointer, an RDMA read can be used to retrieve the data item without requiring any action by the CPU 114 of the host computer 110.

In exemplary embodiments, in response to receiving an access request from a remote computer 102, the host computer 110 computer enters into a lease with the remote computer 102 for the requested data item. The lease is an agreement between host computer 110 and remote computer 102 that grants the remote computer 102 the privilege to conduct RDMA reads and guarantees the availability of the data item until an expiration time. In exemplary embodiments, the host computer maintains a global view of access patterns of data items stored in the cache by assigning a lease to every one of the data items stored in the cache. In exemplary embodiments, while the lease grants the holder the privilege to conduct RDMA read, it may not grant the holder the privilege to update the data item.

In exemplary embodiments, the term, or length, of the lease may be determined by the access history of the data item. In general, the use of a single fixed lease term for all of the data items is inefficient because long-lease term can cause cache to be populated with unpopular items and short-lease term can cause frequent remote pointer invalidation, thus low utilization of RDMA. In exemplary embodiments, assigning longer term leases to data items exhibiting frequent reads is more beneficial than doing so for items with frequent updates but less reads. In exemplary embodiments, the lease term for each item shall be determined by considering several factors which include, but are not limited to, an operation event for a data item, an access recency of a data item and an access frequency of the data item. In one example the lease term may be a function such as: term=$f$(operation_type, approximate_access_history).

In exemplary embodiments, every time an operation that the host computer is aware of, such as a (e.g., read, write or update) that accesses the data item, the lease may be extended by a time period. In one embodiment, the lease extension may be calculated by lease=now+term to prevent lease from being extended unlimitedly when a large number of clients access the data simultaneously. The host computer may embed the extended lease term in the returning values to inform the remote computer the valid time range during which RDMA read can be applied to fetch the data.

Figure 2:
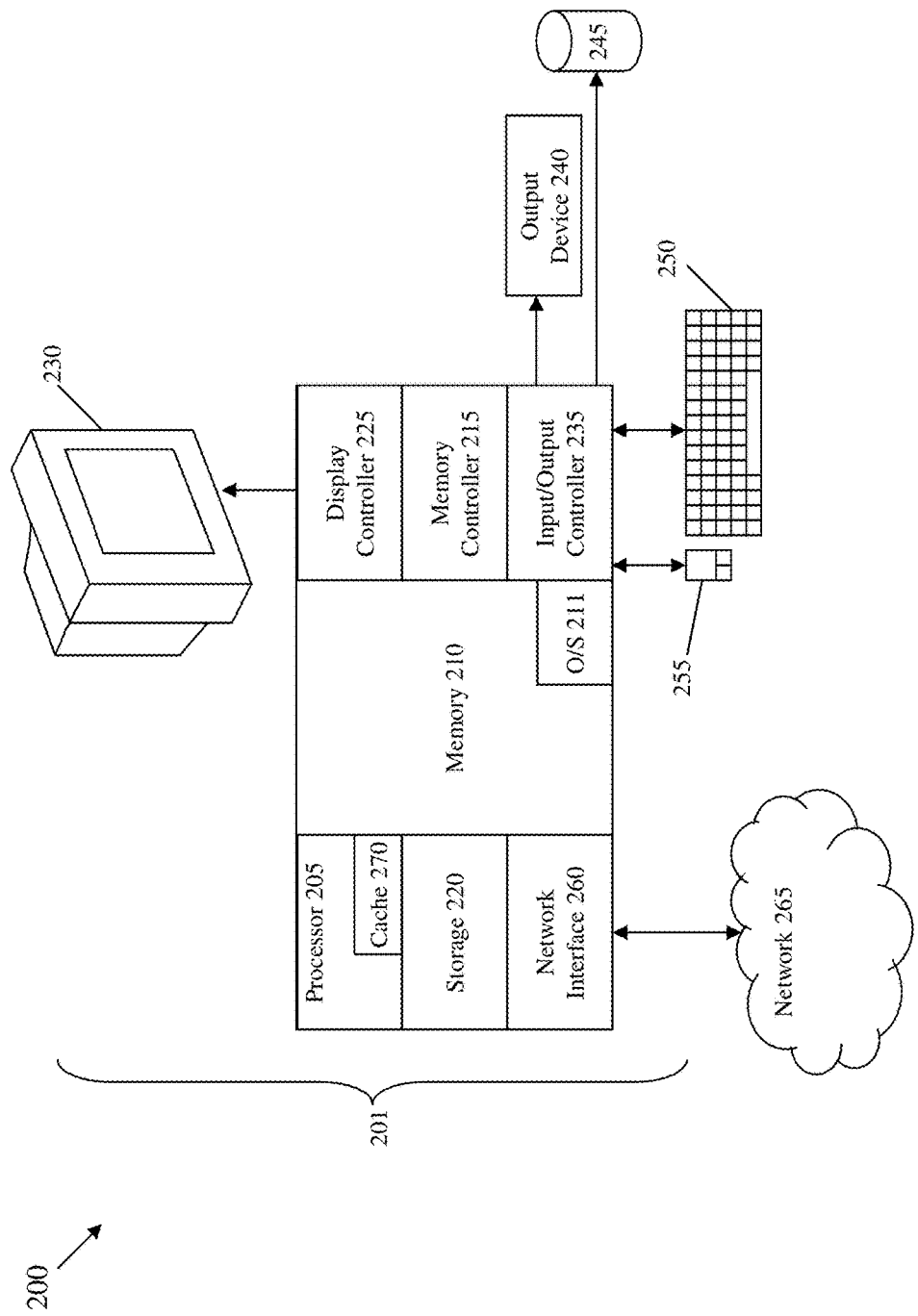
FIG. 2 depicts a block diagram of a computing system in accordance with an exemplary embodiment.

FIG. 2 illustrates a block diagram of an exemplary computer system 200 for use with the teachings herein. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 200 therefore includes general-purpose computer 201.

In an exemplary embodiment, in terms of hardware architecture, as shown in FIG. 2, the computer 201 includes a processor 205, memory 210 coupled via a memory controller 215, a storage device 220, and one or more input and/or output (I/O) devices 240, 245 (or peripherals) that are communicatively coupled via a local input/output controller 235. The input/output controller 235 can be, for example, but not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 220 may include one or more hard disk drives (HDD), solid state drives (SSD), or any other suitable form of storage.

The processor 205 is a computing device for executing hardware instructions or software, particularly that stored in memory 210. The processor 205 can be any custom made or commercially available processor, a central processing unit (CPU), an auxiliary processor among several processors associated with the computer 201, a semiconductor based microprocessor (in the form of a microchip or chip set), a macroprocessor, or generally any device for executing instructions. The processor 205 may include a cache 270, which may be organized as a hierarchy of more cache levels (L1, L2, etc.).

The memory 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 210 may incorporate electronic, magnetic, optical, and/or other types of storage media. Note that the memory 210 can have a distributed architecture, where various components are situated remote from one another, but can be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially controls the execution of other computer programs and provides scheduling, input-output control, file and data management, memory management, and communication control and related services.

In an exemplary embodiment, a conventional keyboard 250 and mouse 255 can be coupled to the input/output controller 235. Other output devices such as the I/O devices 240, 245 may include input devices, for example but not limited to a printer, a scanner, microphone, and the like. Finally, the I/O devices 240, 245 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 200 can further include a display controller 225 coupled to a display 230. In an exemplary embodiment, the system 200 can further include a network interface 260 for coupling to a network 165. The network 265 can be an IP-based network for communication between the computer 201 and any external server, client and the like via a broadband connection. The network 265 transmits and receives data between the computer 201 and external systems. In an exemplary embodiment, network 265 can be a managed IP network administered by a service provider. The network 265 may be implemented in a wireless fashion, e.g., using wireless protocols and technologies, such as Wi-Fi, WiMax, etc. The network 265 can also be a packet-switched network such as a local area network, wide area network, metropolitan area network, Internet network, or other similar type of network environment. The network 265 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 201 is a PC, workstation, intelligent device or the like, the instructions in the memory 210 may further include a basic input output system (BIOS) (omitted for simplicity). The BIOS is a set of essential routines that initialize and test hardware at startup, start the OS 211, and support the transfer of data among the storage devices. The BIOS is stored in ROM so that the BIOS can be executed when the computer 201 is activated.

When the computer 201 is in operation, the processor 205 is configured to execute instructions stored within the memory 210, to communicate data to and from the memory 210, and to generally control operations of the computer 201 pursuant to the instructions.

Figure 3:
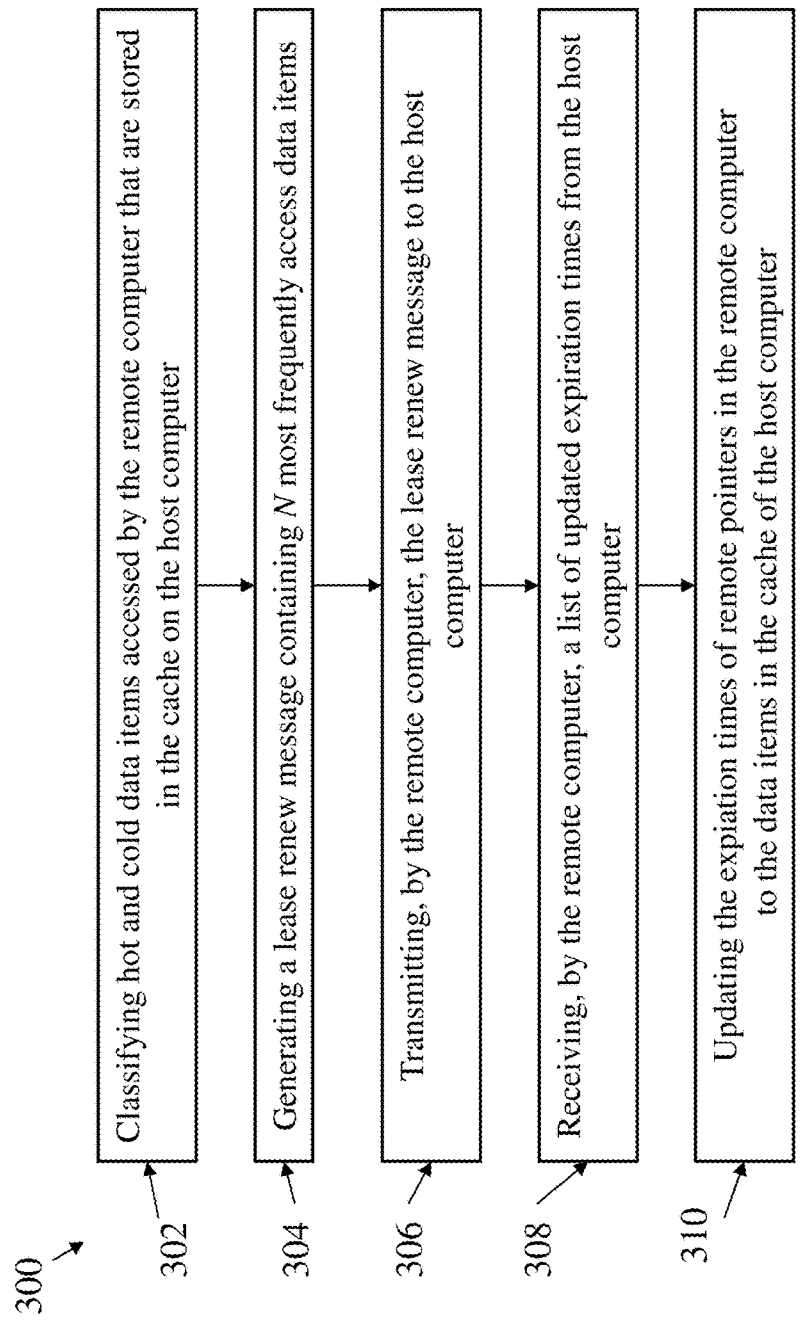
FIG. 3 depicts a flow chart diagram of a method for cache management by a remote computer for accessing an RDMA data store in accordance with an exemplary embodiment.

Referring now to FIG. 3, a flow chart diagram of a method 300 for cache management by a remote computer for accessing an RDMA data store in accordance with an exemplary embodiment is shown. As shown at block 302, the method 300 includes classifying hot-cold data items accessed by the remote computer that are stored in the cache. Next, as shown at block 304, the method 300 includes generating a lease renew message containing N most frequently accessed data items. In exemplary embodiments, the lease renew message includes both an identifier of each of the N most frequently accessed data items and a requested lease duration. Next, as shown at block 306, the method 300 includes transmitting the lease renew message to the host computer. The method 300 also includes receiving a list of updated lease expiration times from the host computer, as shown at block 308. Next, as shown at block 310, the method 300 includes updating the expiation times of the remote pointers in remote computer based on the list of updated lease expiration times.

In exemplary embodiments, classifying hot-cold data items includes determining the hotness or coldness of each data item in the cache that is accessed by the remote computer, i.e., how frequently and/or recently each data item has been accessed. Any of a wide variety of methods for determining the hotness or coldness of each data item may be used by the remote computers. However, in exemplary embodiments, the host computer instructs each of the remote computers to utilize a common method for classifying hot-cold data items so that the host computer can accurately combine the data received from multiple remote computers.

In exemplary embodiments, reporting excessive access history by the remote computers can quickly overload the host computer, hurting the quality of service (QoS) of performance-critical operations. Accordingly, the QoS is prioritized over accurate popularity tracking by limiting a time-bound (e.g., 500 µs) for processing each access report. In exemplary embodiments, to effectively utilize the time-bound, the remote computers selectively choose hot data items to be included in the access reports to renew the leases. In exemplary embodiments, the remote computers maintain a most recently accessed data item queue and a most frequently accessed data queue. The remote computer selects m items from both queues to be included in the access reports in order to capture the data items with growing popularity and the data items with established access frequency.

Figure 4:
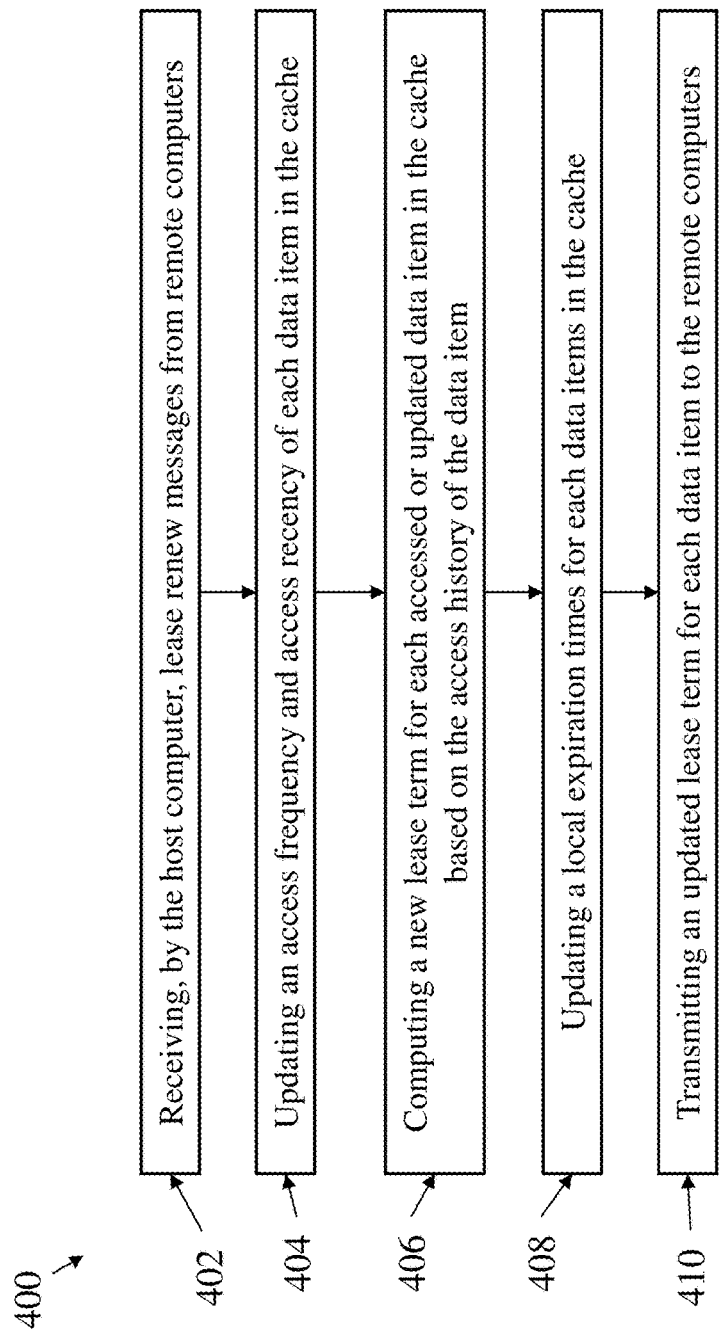
FIG. 4 depicts a flow chart diagram of a method for cache management for an RDMA data store in accordance with an exemplary embodiment.

Referring now to FIG. 4, a flow chart diagram of a method for cache management for an RDMA data store in accordance with an exemplary embodiment is shown. As shown at block 402, the method 400 includes receiving lease renew messages from remote computers. In exemplary embodiments, the lease renew messages received from the remote computers includes the access history of the remote computer for each of the data items accessed by remote computer. Next, as shown at block 404, the method 400 includes updating an access history, including the access frequency and access recency, of each data item in the cache. In exemplary embodiments, the access frequency and recency of each data item in the cache are updated based on the data contained in the lease renew messages received from the remote computers. Next, as shown at block 406, the method 400 includes computing a new lease term for each accessed or updated data item in the cache based on the access history of the data items.

Continuing with reference to FIG. 4, the method 400 also includes updating host expiration times for each data item in the cache, as shown at block 408. Next, as shown at block 410, the method 400 includes transmitting an updated lease term for each data item to each of the remote computers. In exemplary embodiments, the updated lease term may include the local expiration time for each data item. In exemplary embodiments, the remote computer and the host computers may have synchronized clocks and in such cases the local expiration time may be the same time as the host expiration time. However, in some cases, the host expiration time may be set to be slightly delayed from the local expiration time to ensure that a data access by a remote computer near the expiration time does not return invalid or corrupted data.

In exemplary embodiments, computing the new lease term for each accessed or updated data item in the cache is based on the access history, including the access recency and access frequency, of the data items. In exemplary embodiments a multi-queue may be maintained to store the lease term of the data items in the cache. In general, the multi-queue is used to group data items into buckets that correspond to the relative popularity of the data items.

Figure 5:
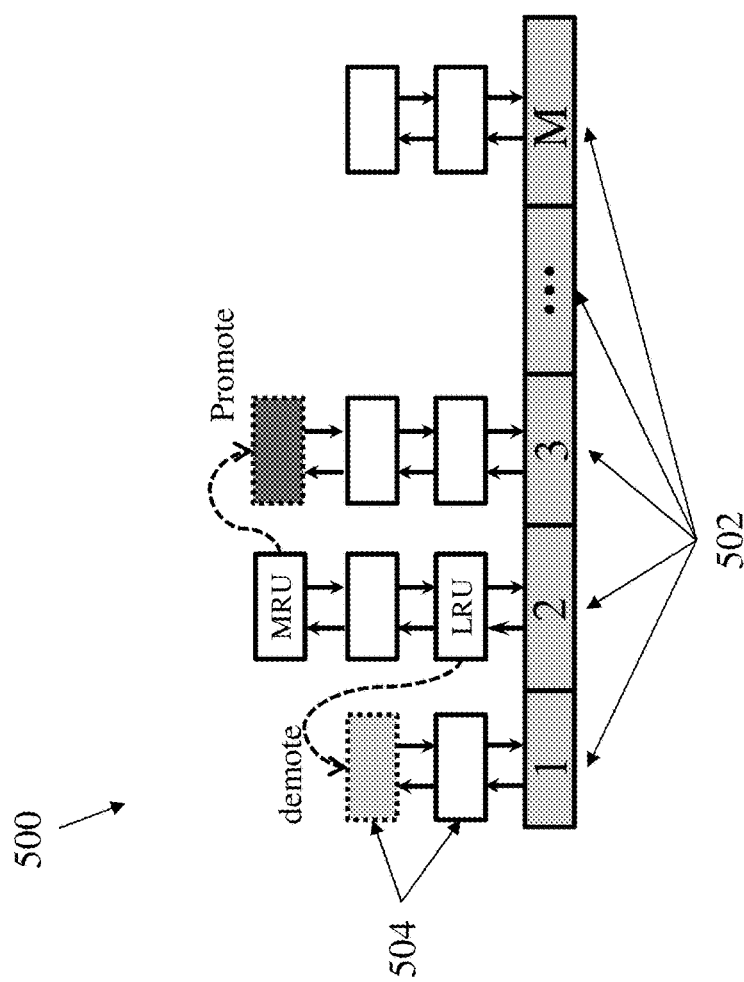
FIG. 5 depicts a block diagram illustration of multi-queue used for cache management for an RDMA data store in accordance with an exemplary embodiment.

FIG. 5 illustrates a block diagram of an exemplary multi-queue 500. As illustrated the multi-queue 500 includes a plurality of groups 502 which each contain one or more data items 504. Each of the data items 504 in the cache are assigned to one of the groups 502 and each of the data items 504 in a group 502 will have a lease term that is the same. In exemplary embodiments, the groups 502 are each used to store an ordered queue of data items 504 based on their access history and data items 504 can be promoted or demoted from one group 502 to the next based on any changes in the access history of the data item.

In exemplary embodiments, the host computer may communicate the lease term with the remote computers by periodically transmitting new lease terms in response to receiving lease renew messages from remote computers. In addition, the host computer may communicate the lease term with the remote computers by appending the lease term to a data item each time the data item is transmitted to a remote server. By appending the lease term to a data item each time the data item is transmitted to a remote server the host computer can ensure that each of the remote computers accessing the data have the most current least term for the data item.

In exemplary embodiments, the host computer may periodically update the data stored for a data item which has outstanding pointers to it in one or more remote machines. In one embodiment, the host computer may be configured to update the data via an in place update, that is where the new data is written to the same location that the old data was stored. In another embodiment, the host computer may be configured to update the data via an out of place update, that is where the new data is written to a new location that is different from old data was stored and a pointer or other indicator of the location of the new data is added to the data stored in the old location. The out of place update offers several advantages over the in place update. For example, if a data access occurs during an in place data update, the data read may be corrupted. In addition, the new data to be written may be larger than the space allocated by the old data.

In exemplary embodiments, the multi-queue used by the cache management method to determine the lease term for the data items adaptively updates the lease terms according to the access frequencies of the data items and memory utilization on the host computer. The multi-queue technique is referred to herein as a Popularity-Differentiated Lease Assignment policy (PDLA) and it strives to attain high hit ratios for cached data items on the host computer while increasing the chance for remote computers to leverage RDMA data access.

For each cached data item, PDLA memorizes an approximate access count c in the descriptor that is only updated by host computer aware operations and lease-renew requests. In addition, it organizes all cached data items according to their approximate frequency counts into M queues. Within each queue, the least recently accessed descriptor is linked to the head. Queues with higher indices contain data items that are more frequently used and expected to receive more accesses than those in queues with lower indices. PDLA differentiates the popularity of different cached data items and assigns longer leases to data items contained in higher queues by formula term=qid*α with the intention that the remote pointers for hot items can stay valid on remote computers for longer period. In addition, α is further determined based on the memory utilization p following a linear model α=f(p). When cache is under heavy utilization, the host computer may not be able to guarantee a long term monopolization of one memory chunk for a data item, thus it reflects such information by decreasing the α, and such information will be conveyed to remote computers to limit the time range RDMA can be issued to retrieve the item. In contrast, PDLA increases α to allow more RDMA accesses when there is sufficient space on the server sides.

When a host computer aware data access occurs, PDLA updates the recent popularity of the item via qid=log 2(c), and determines whether the item shall be promoted into a higher queue (when qid exceeds the range, it is put into the queue with the highest index). In exemplary embodiments, a promotion inserts the data into the tail of next higher queue. Upon the completion of update, PDLA also examines the LRU data item of queues within each index. If the lease of the data item has expired, PDLA demotes it into the tail of the lower queue in order to capture the aging of popularity. For a cache miss, PDLA iterates the LRU data item of every queue attempting to find a data item with expired lease to yield space. However, in certain cases, the LRU data items can still hold an active lease. Therefore, PDLA adopts a simple heuristic approach to probe the leases of r items behind the LRU data item of each queue trying to find an evictable data item.

Figures 6A, 6B:
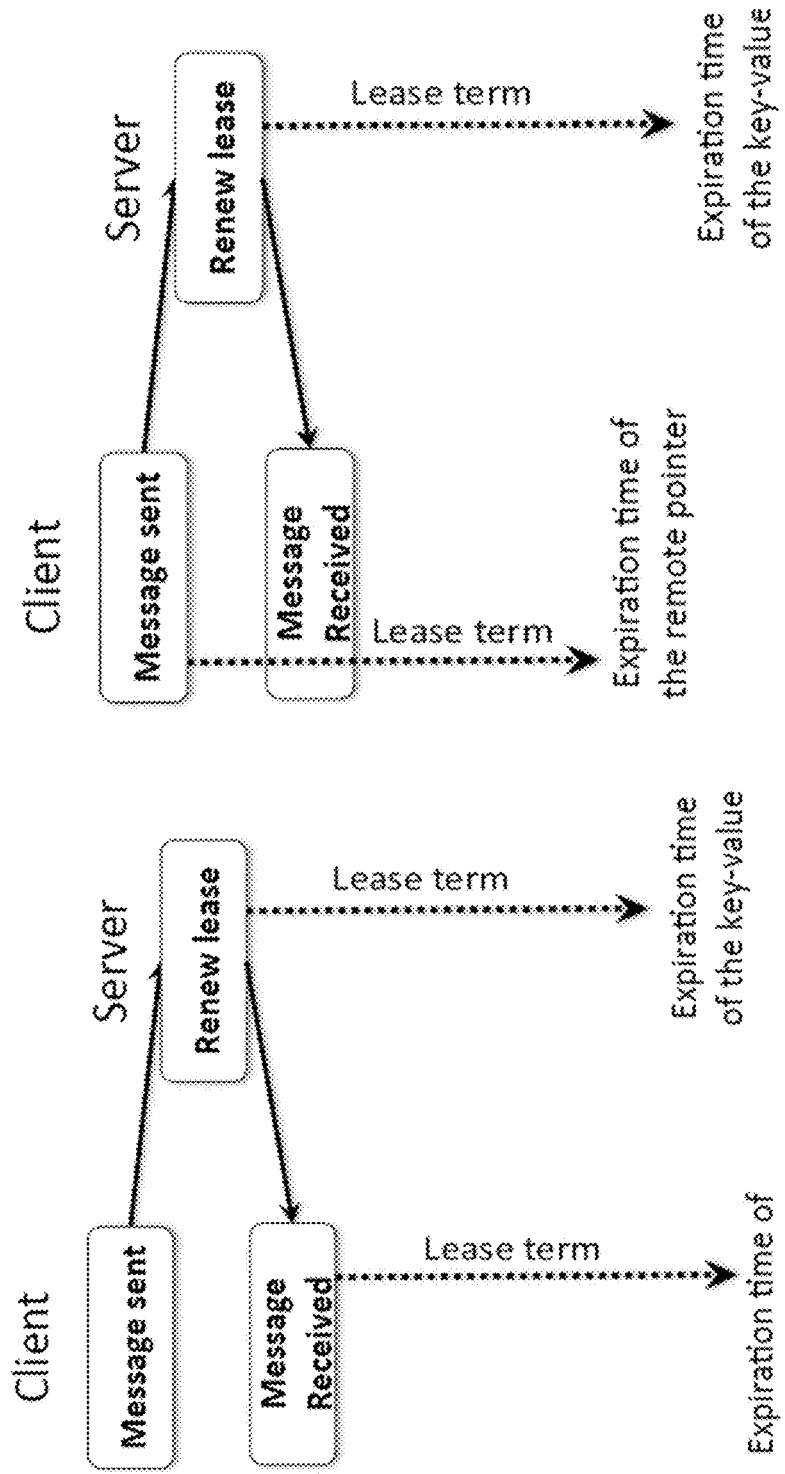
FIGS. 6A and 6B are block diagram illustrating methods for lease term extension when accessing an RDMA data store in accordance with an exemplary embodiment.

In many cases, the clocks on clients and servers are not synchronized. In such scenarios, servers return the lease terms instead of the absolute expiration time of the key-value pairs to clients so that clients can calculate the new expiration time of the remote pointers independently. However, when the message returning the lease terms experiences long network delay, incautiously calculating the new expiration time of the remote pointer by adding the lease term to the time at which message is received will result in potentially incorrect situation, in which the expiration time of the key-value has been reached on the server-side while that residing on the client has not, as shown in FIG. 6Aa. Under such scenario, when a client tries to access the key-value pair via RDMA Read, incorrect data fetching may occur. To avoid such issue, the new expiration time of the remote pointers is conservatively calculated by adding the lease terms to the time at which message is sent, so that from the perspective of client, the expiration time of the remote pointer is always before the expiration time of the key-value pair on the server-side, as shown in FIG. 6B.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for cache management in a Remote Direct Memory Access (RDMA) data store, the computer program product comprising:
    a non-transitory tangible storage medium readable by a processing circuit and storing instructions for execution by the processing circuit for performing a method comprising:
    receiving a request from a remote computer to access a data item stored in the RDMA data store;
    creating a lease including a local expiration time for the data item;
    creating a remote pointer to the data item, wherein the remote pointer includes a remote expiration time;
    transmitting the remote pointer to the remote computer, wherein the lease is an agreement that the remote computer can perform RDMA reads on the data item until the remote expiration time; and
    receiving a lease renew message from the remote computer to extend the lease, wherein the lease renew message includes an access history of the data item by the remote computer.

2. The computer program product of claim 1, wherein the lease renew message includes requested lease duration.

3. The computer program product of claim 1, further comprising:
    updating the remote expiration time and the local expiration time based on a host computer aware data access of the data item;
    receiving, by the host computer, an RDMA read request for the data item from the remote computer; and
    transmitting, by the host computer, the data item with the updated remote expiration time appended to the data item.

4. The computer program product of claim 1, wherein the remote expiration time is delayed from the local expiration time by a delay period.

5. The computer program product of claim 1, wherein the remote expiration time is equal to the local expiration time.

6. The computer program product of claim 1, further comprising:
    based on a determination that a current time is equal to the local expiration time of the data item, scheduling the data item for eviction after a delay period.

7. A system for cache management in a Remote Direct Memory Access (RDMA) data store, the system comprising a processor configured for performing a method comprising:

receiving a request from a remote computer to access a data item stored in the RDMA data store;

creating a lease including a local expiration time for the data item;

creating a remote pointer to the data item, wherein the remote pointer includes a remote expiration time;

transmitting the remote pointer to the remote computer, wherein the lease is an agreement that the remote computer can perform RDMA reads on the data item until the remote expiration time; and receiving a lease renew message from the remote computer to extend the lease, wherein the lease renew message includes an access history of the data item by the remote computer.

8. The system of claim 7, wherein the method further comprises:

updating the remote expiration time and the local expiration time based on a host computer aware data access of the data item;

receiving, by the host computer, an RDMA read request for the data item from the remote computer; and transmitting, by the host computer, the data item with the updated remote expiration time appended to the data item.

* * * * *